(12) United States Patent
Nishikata

(10) Patent No.: US 6,769,768 B2
(45) Date of Patent: Aug. 3, 2004

(54) BIFOCAL LENS

(75) Inventor: Masato Nishikata, Fukui-ken (JP)

(73) Assignee: Combex Ltd., Sabae (JP)

( * ) Notice: Subject to any disclaimer, the term of this patent is extended or adjusted under 35 U.S.C. 154(b) by 0 days.

(21) Appl. No.: 10/318,325

(22) Filed: Dec. 12, 2002

(65) Prior Publication Data
US 2003/0223034 A1 Dec. 4, 2003

(30) Foreign Application Priority Data
May 29, 2002 (JP) ........................ 2002-155572

(51) Int. Cl.[7] .................................. G02C 7/06
(52) U.S. Cl. ............................................ 351/168
(58) Field of Search ....................... 351/159, 161–2, 351/169, 160 H, 160 R, 164, 168

(56) References Cited

U.S. PATENT DOCUMENTS 4,577,942 A * 3/1986 Frieder et al. .............. 351/159
4,679,918 A * 7/1987 Ace ............................ 351/163
4,846,913 A * 7/1989 Frieder et al. .............. 156/242

* cited by examiner

Primary Examiner—Jordan M. Schwartz
Assistant Examiner—Jessica Stultz
(74) Attorney, Agent, or Firm—Flynn, Thiel, Boutell & Tanis, P.C.

(57) ABSTRACT

A plastic bifocal lens includes a lens matrix. The front and rear sides of the lens matrix each include a far-sight section and a near-sight section. The front far-sight section has curvature which is smaller than the curvature of the rear far-sight section. The front near-sight section has a curvature that is larger than the curvature of the front far-sight section. The front and rear sides of the lens matrix are coated with a coating material having a lower refractive power than a material used to form the lens matrix. The curvatures at both the front and rear sides are formed to become smooth surfaces. The smooth surfaces prevent stains from being accumulated at specific locations on the front and rear surfaces.

4 Claims, 1 Drawing Sheet

BIFOCAL LENS

DESCRIPTION OF THE INVENTION

1. Field of the Invention

The present invention relates to a double-focusing lens made of plastic for eyeglasses.

2. Prior Arts

In the prior arts, plastic-made eyeglasses are molded by a casting polymerization method by which, after a thermally-hardening type resin monomer having a catalyst added thereto is injected in a molding die and heated, the resin monomer is polymerized and hardened in the molding die.

Where a one-piece type double-focusing lens is formed, for example, the front side or rear side of a lens formed by the above-described method is polished, and two portions each having a different curvature are formed, wherein a portion of a low refractive index having a smaller curvature is made into a far-sight section, and a portion of a high refractive index having a larger curvature is made into a near-sight section.

However, since, in the above-described double-focusing lens, the curvature of the front side of the lens greatly changes at the boundary between the far-sight section and the near-sight section, and the front side of the near-side of the near-sight section further projects in comparison with the far-sight section, dust and sand, etc., are liable to be accumulated on the boundary portion at the front side of the lens, and further it is difficult to wipe off stains adhered to the boundary portion.

SUMMARY OF THE INVENTION

The present invention relates to a double-focusing lens made of plastic in view of solving the objects to improve characteristics for preventing stains and wiping off the same on the basis of the prior arts described above, in which the front and rear sides of a lens matrix having a far-sight section having a front curvature which is smaller than a rear curvature and a near-sight section having a front curvature which is larger than the front curvature of said far-sight section are coated with a matrix having a lower refractive power than a material used to form said lens matrix, and the curvatures at both the front and rear sides are formed to become uniform, whereby stains that are accumulated at a specified portion on the front and rear sides of the lens are prevented from being accumulated, and can be easily wiped off in order to solve the objects.

In summary, a double-focusing lens made of plastic according to the invention is constructed so that the front and rear sides of a lens matrix having a far-sight section having a front curvature which is smaller than a rear curvature and a near-sight section having a front curvature which is larger than the front curvature of said far-sight section are coated with a matrix having a lower refractive power than a material used to form said lens matrix, and the curvatures at both the front and rear sides are formed to become uniform. Therefore, if the curvatures of the lens are adjusted to prescribed degrees, the far sight section is able to correct myopia and the near-sight section is able to correct presbyopia. Further, there is no unevenness on the front and rear sides thereof, no stain is accumulated on any specified portions of the front and rear sides, and it is possible to easily wipe off any stains.

For example, since refraction occurs in the convergence direction only when light enters if the near-sight section of the lens matrix is made convex on the front side thereof and flat on the rear side (that is, with one side convex and the other side flat), it is necessary that the curvature of the near-sight section is increased in cases where additional power is intensified. Resultantly, the near-sight section is made thick. However, since the near-sight section is made convex at both sides so as to project to the front and rear sides of a lens matrix, a light beam transmitted through the near-sight section is refracted in a convergence direction in both cases where it enters and radiates. Accordingly, in the case of a both-side convex type, the curvature can be made smaller and the lens can be made thinner than in the case where the near-sight section is made with one side convex and the other side flat. That is, it is possible to make the thickness of a double-focusing lens thin even if a coating layer is provided on the front and rear sides of the lens matrix.

Since the molding material of the lens matrix is made of polyurethane and the coating material thereof is made of allyl diglycol carbonate resin, not only is the light transmissivity satisfactory but also the adhesivity between the lens matrix and the coating material becomes satisfactory, wherein these components can be tightly integrated. Even if the lens is subjected to external forces such as vibrations and impacts, the coating layer is not peeled off. Therefore, the present invention can bring about a double-focusing lens whose durability is excellent, wherein its practical effects are remarkable.

DESCRIPTION OF THE PREFERRED EMBODIMENTS

Hereinafter, a description is given of one embodiment of the invention.

Figure 1:
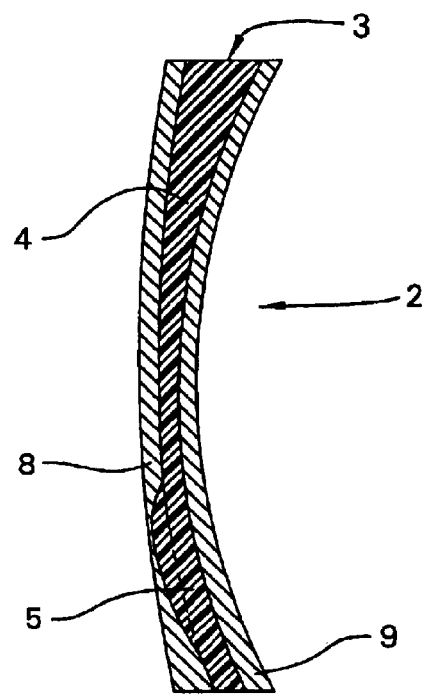
FIG. 1 illustrates a bifocal lens having a far-sight section and a near-sight section.

FIG. 1 shows a plastic-made bifocal lens 2 according to the invention in which the front and rear sides of a lens matrix 3 having concave and convex portions are coated with a coating material 8, 9 different from a molding material of the corresponding lens matrix, and the curvatures of the front and rear sides are formed to become uniform with a smooth surface.

The lens matrix 3 is a one-piece type having a far-sight section 4 and a near-sight section 5 in a single lens 2. The far-sight section 4 is formed to be convex in the forward direction, in which the front side curvature is smaller than the rear side curvature as in general eyeglasses for near-sightedness, and the front side of the near-sight section 5 has a larger curvature than the front side of the above-described far-sight portion and is formed so as to project forward.

Figure 2:
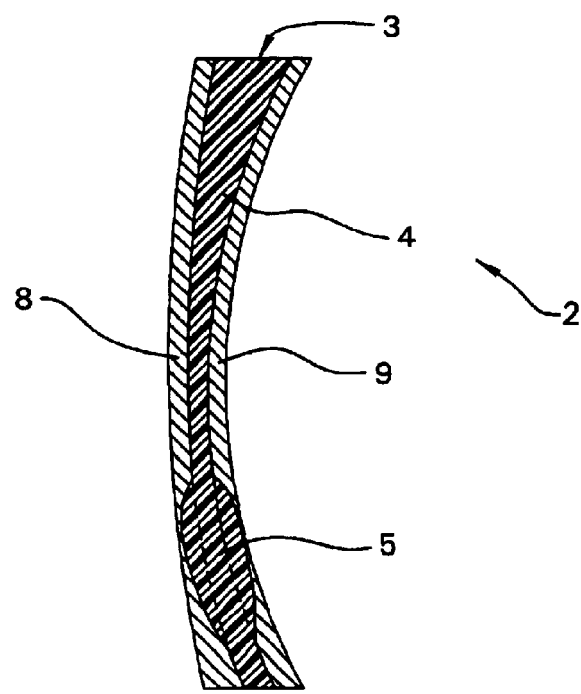
FIG. 2 illustrates a bifocal lens with a lens matrix having a near-sight section that is convex at both sides.

Also, the near-sight section 5 can project (swell) to both sides at the front and rear sides of the lens matrix and may be formed to be convex at both sides as shown in FIG. 2.

Although it is favorable that the coating material 8, 9 of the lens 2 has a lower refractive index than that of the molding material of the lens matrix 3, it is favorable that, in view of light transmissivity and adhering performance between the lens matrix and the coating material, the lens matrix is made of polyurethane and the coating material 8, 9 is made of allyl diglycol carbonate resin (ADC resin).

Next, a description is given of a method for producing the bifocal lens according to the invention.

First, a one-piece type lens matrix is produced, which has two focusing points, one of which is for far sight and the other of which is for near sight, in a single lens by a casting polymerization method.

In addition, the underside of the upper die and upper side of the lower die, which are used to produce the lens matrix 3 are caused to have convex and concave portions corresponding to the shapes of the front and lower sides of the far-sight and near-sight sections of the lens matrix.

Next, the above-described lens matrix 3 is fitted to a recessed groove circumferentially secured at the middle of the inner surface of a cylindrical gasket that is longitudinally dividable into two sections, and the upper and lower die are mounted in the upper and lower openings of the gasket. After that, a liquefied ADC resin monomer to which a catalyst is added is poured in a space surrounded by the upper and lower die in the up and down direction of the lens matrix 3 and the gasket. And the molding die are heated together with their content, whereby the ADC resin is polymerized and hardened, and a coated layer 8, 9 comprising ADC resin is formed on both sides of the lens matrix 3.

Also, in the upper and lower die used to form the coating layers 8, 9, the curvature of the underside of the upper die is different from that of the upperside of the lower die, and the curvature of the underside of the upper die is made smaller than that of the upperside of the lower die.

Finally, the upper and lower die are removed from the gasket, and the gasket is divided into two sections to pick up a molded article. After that, the surface and rear sides of the molded article is processed for hard coating by an appropriate method.

Next, a description is given of an action of the bifocal lens according to the invention.

Although, in the bifocal lens according to the invention, a polyurethane-made lens matrix 3 is coated with ADC resin, influence with respect to light transmissivity becomes larger in the lens matrix than in the coating layer 8, 9 since the refractive index of the ADC resin is smaller than that of polyurethane.

That is, since a light beam incident into the coating layer 8 at the surface side is refracted in a convergence direction at the far-sight section 4 because the surface of the coating layer is slightly convex, the light beam is further refracted in the convergence direction when it enters the front side of the lens matrix 3. However, since the curvature of the rear side of the lens matrix 3 is larger than that of the front side, the light beam is refracted in a diffusion direction when it radiates from the lens matrix, and the light beam is also refracted in the diffusion direction when it radiates from the coating layer 9 of the rear side, wherein the focus point of the light beam is made coincident with the apocenter of adjustment of near-sightedness (myopia).

In addition, the light beam that is transmitted through the coating layer 8 on the surface side and is refracted in the convergence direction at the near-sight section 5 is also refracted in the convergence direction when entering and radiating since the near-sight section 5 of the lens matrix 3 is formed so as to project to both sides. Thereafter, the light beam is slightly refracted in the diffusion direction when it radiates from the coating layer 9 of the rear side. However, since influences of the coating layer are slight, the light beam is refracted in the convergence direction as a whole, wherein the focus point of the light beam is made coincident with the far point of adjustment of presbyopia.

What is claimed is:

1. A bifocal lens made of plastic, in which the front and rear sides of a lens matrix each comprise a far-sight section and a near-sight section, the front far-sight section having a curvature which is smaller than the curvature of the rear far-sight section, the front near sight section having a curvature which is larger than the curvature of the front far-sight section; and wherein the lens sections are coated with a coating material having a lower refractive power than a material used to form said lens matrix, and both the front and rear sides are formed to provide smooth surfaces.

2. The bifocal lens as set forth in claim 1, wherein the near-sight section of the lens matrix is made into a double-side projecting type, which projects to the front and rear sides of the lens matrix.

3. The bifocal lens as set forth in claim 2, wherein a material used to form the lens matrix comprises polyurethane, and the coating material comprises allyl diglycol carbonate resin.

4. The bifocal lens as set forth in claim 1, wherein a material used to form the lens matrix comprises polyurethane, and the coating material comprises allyl diglycol carbonate resin.

* * * * *